US011498629B2

(12) United States Patent
Shaner et al.

(10) Patent No.: US 11,498,629 B2
(45) Date of Patent: Nov. 15, 2022

(54) BARRIERS FOR REAR FRAME MOUNTED SPARE TIRES

(71) Applicant: Ford Global Technologies, LLC, Dearborn, MI (US)

(72) Inventors: Leonard Anthony Shaner, New Baltimore, MI (US); Diego Eduardo Mendoza Hernández, Mexico City (MX); Greg Gombert, Canton, MI (US); Marcela Arana, Plymouth, MI (US); Peter Joseph Jargowsky, Canton, MI (US); Sukhwinder Singh Dhindsa, Windsor (CA); Jeffrey A. Walesch, Canton, MI (US); Chih-Yu Lin, Canton, MI (US); Mikolaj Tyksinski, Dearborn, MI (US); Grant Warr, Bloomfield Hills, MI (US); William L. Duncan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 17/121,406

(22) Filed: Dec. 14, 2020

(65) Prior Publication Data

US 2022/0185396 A1 Jun. 16, 2022

(51) Int. Cl.
*B60J 7/00* (2006.01)
*B62D 43/04* (2006.01)
*B62D 21/15* (2006.01)
*B62D 25/20* (2006.01)
*B60R 21/00* (2006.01)

(52) U.S. Cl.
CPC .......... *B62D 43/04* (2013.01); *B62D 21/152* (2013.01); *B62D 25/20* (2013.01); *B60R 2021/0011* (2013.01)

(58) Field of Classification Search
CPC ..... Y10S 707/99933; Y10S 707/99935; Y10S 707/99936; G06N 20/00; G06K 9/6256; B32B 27/08; B32B 27/32; C03C 17/366; C03C 17/3626; C03C 17/3681
See application file for complete search history.

(56) References Cited

U.S. PATENT DOCUMENTS

| 2,806,616 | A | * | 9/1957 | Fisher | ................... | B62D 43/04 414/466 |
| 3,330,431 | A | * | 7/1967 | Knecht | ................. | B62D 43/04 414/466 |
| 3,811,698 | A | * | 5/1974 | Glance | ................... | B62D 43/04 293/133 |

(Continued)

FOREIGN PATENT DOCUMENTS

| EP | 1755936 | 2/2007 |
| JP | 2002321642 | 11/2002 |

(Continued)

*Primary Examiner* — Kiran B Patel
(74) *Attorney, Agent, or Firm* — Gregory Brown; Hanley, Flight & Zimmerman LLC

(57) ABSTRACT

Barriers for rear frame mounted spare tires are disclosed. An example vehicle disclosed herein includes a frame including a cross member, a spare tire, a skid plate, and a barrier extending between the skid plate and the cross member, the barrier abutting the spare tire, the barrier including a first surface having a first curvature, the first curvature concave relative to a rear of the vehicle.

20 Claims, 9 Drawing Sheets

(56) References Cited

U.S. PATENT DOCUMENTS

| | | | | |
|---|---|---|---|---|
| 4,428,513 A * | 1/1984 | Delmastro | ............. | B62D 43/04 |
| | | | | 414/466 |
| 5,114,184 A * | 5/1992 | Shimomura | ......... | B62D 21/152 |
| | | | | 280/834 |
| 2006/0061142 A1* | 3/2006 | Kobayashi | ......... | B62D 25/2027 |
| | | | | 296/203.04 |
| 2009/0195032 A1* | 8/2009 | Yamaguchi | ........ | B62D 25/2027 |
| | | | | 296/203.04 |
| 2010/0072786 A1* | 3/2010 | Koyama | ........... | B62D 25/2027 |
| | | | | 296/203.04 |
| 2011/0227367 A1* | 9/2011 | Funakoshi | ............. | B62D 43/10 |
| | | | | 296/187.11 |
| 2019/0016391 A1* | 1/2019 | Inoue | .................... | B62D 21/11 |
| 2019/0308575 A1* | 10/2019 | Kashiwazaki | .......... | B60R 19/02 |
| 2020/0391812 A1* | 12/2020 | Takeda | ................... | B62D 43/10 |
| 2022/0185396 A1* | 6/2022 | Shaner | ................... | B62D 25/20 |

FOREIGN PATENT DOCUMENTS

| | | |
|---|---|---|
| KR | 20020036491 | 5/2002 |
| KR | 20030041305 | 5/2003 |

* cited by examiner

BARRIERS FOR REAR FRAME MOUNTED SPARE TIRES

FIELD OF THE DISCLOSURE

This disclosure relates generally to vehicle structures and, more particularly, to barriers for rear frame mounted spare tires.

BACKGROUND

A vehicle frame, also referred to as a chassis, is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.). Some frames include features that enable a spare tire to be mounted thereto.

SUMMARY

An example vehicle disclosed herein includes a frame including a cross member, a spare tire, a skid plate, and a barrier extending between the skid plate and the cross member, the barrier abutting the spare tire, the barrier including a first surface having a first curvature, the first curvature concave relative to a rear of the vehicle.

An example apparatus to be coupled between a cross member of a frame and a skid plate disclosed herein includes a first surface including first mounting features to enable the apparatus to be coupled to the cross member, a second surface including second mounting features to enable the apparatus to be coupled to the skid plate, a third surface extending between the first surface and the second surface, the third surface having a curvature oriented to deflect a spare tire downward.

Figure 1:
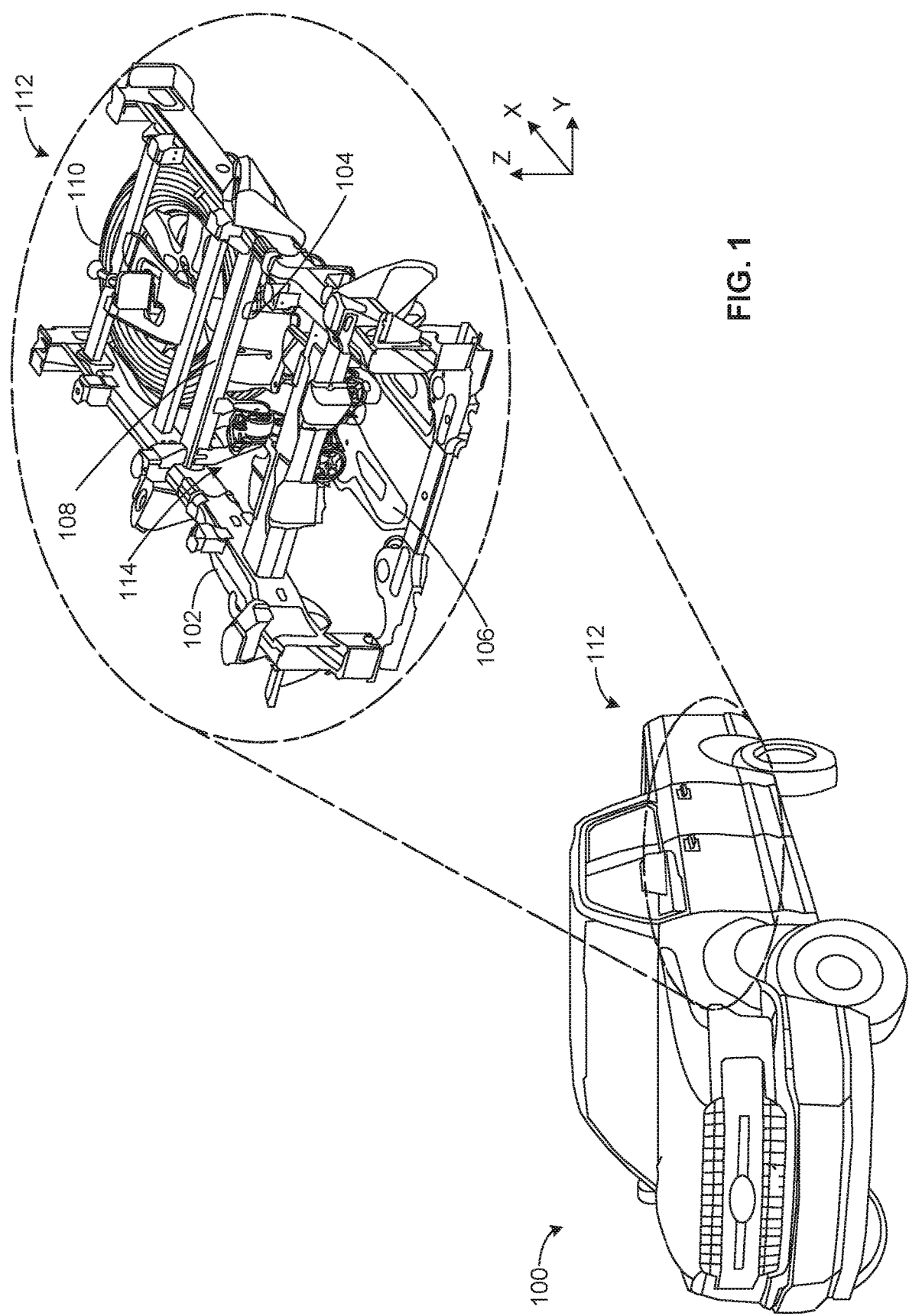
FIG. 1 illustrates an example vehicle with a rear frame barrier.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., section, linkage, area, region, or plate, etc.) is in any way on (e.g., positioned on, located on, disposed on, disposed about, or formed on, etc.) another part, indicates that the referenced part is either in contact with the other part, or that the referenced part is above the other part with one or more intermediate part(s) located therebetween. Connection references (e.g., attached, coupled, connected, joined, etc.) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

DETAILED DESCRIPTION

In recent years, many vehicles that traditionally had internal combustion engines have been converted to fully electrified vehicles and/or partially electrified vehicles. In some examples, vehicle subsystems must be redesigned to accommodate electric vehicle (EV) components (e.g., batteries, power distribution units (PDU), electric motors, etc.) while meeting crash safety requirements. For example, some vehicles include spare tires mounted underneath the frame of the vehicle adjacent the rear of the vehicle. Some EVs include electric motors corresponding to individual axles of the vehicle. As such, vehicles that previously had front-mounted engines can, additionally or alternatively, include powertrain components mounted at the rear of the vehicle. These additional powertrain components require additional frame and/or structural components to protect the powertrain components from damage and/or undue wear.

Example disclosed herein reduce the likelihood that a spare tire damages the powertrain of a vehicle during a rear impact. Examples disclosed herein include barriers disposed in front of a spare tire coupled beneath the frame of a vehicle. In some examples disclosed herein, the barriers are shaped to deflect the spare tire downward during a rear impact. In some examples disclosed herein, a top surface of the vehicle is coupled to a cross member of the vehicle frame. In some examples disclosed herein, a bottom surface of the barrier is coupled to a skid plate of the vehicle. In such examples disclosed herein, the skid plate protects the electrical components from rough and/or uneven driving surfaces.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the orientation of features is described with reference to a lateral axis, a vertical axis, and a longitudinal axis of the vehicle associated with the features. As used herein, the longitudinal axis of the vehicle is parallel to the centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively As used herein, the lateral axis of the vehicle is perpendicular to the longitudinal and vertical axes and is generally parallel to the axles of the vehicle. In general, the attached figures are annotated with a set of axes including the lateral axis (Y), the longitudinal axis (X), and the vertical axis (Z). As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.). As used herein, "approximately" and "about" refer to dimensions that may not be exact due to manufacturing tolerances and/or other real-world imperfections.

FIG. 1 illustrates an example vehicle 100 including an example frame 102 with a rear frame barrier 104. In the illustrated example of FIG. 1, the barrier 104 is coupled between an example skid plate 106 and an example cross member 108. In the illustrated example of FIG. 1, the barrier 104 is coupled forward of an example spare tire 110, which is coupled beneath the frame 102 at an example rear portion 112 of the vehicle 100.

The vehicle 100 is a motorized wheel-driven vehicle. In the illustrated example of FIG. 1, the vehicle 100 is a pick-up truck. In other examples, the vehicle 100 can be any type of wheeled vehicle (e.g., a truck, a sports utility vehicle (SUV), a semi-trailer truck, an all-terrain vehicle (ATV), farming equipment, etc.). In some examples, the vehicle 100 is an EV. In such examples, the vehicle 100 includes one or more electric motors and one or more battery arrays. In other examples, the vehicle 100 includes an internal combustion engine (e.g., a non-electrified vehicle, a partially electrified vehicle, etc.).

The frame 102 of the vehicle 100 supports the components of the vehicle 100 (e.g., the powertrain, an electric motor, the vehicle cabin, etc.). The frame 102 is composed of longitudinal structural members (hereafter "side rails") and lateral structural members (hereafter "cross members"), including the example cross member 108. In the illustrated example of FIG. 1, the frame 102 defines an open area 114. In some examples, an electric motor and/or other vehicle components can be disposed within the area 114. In such examples, the electric motor drives the rear axle of the vehicle 100. In the illustrated example, the frame 102 is a ladder frame. In other examples, the frame 102 can have any other suitable type of arrangement (e.g., a unibody frame, other types of body-on-frame arrangements, etc.). The frame 102 can be composed of steel, aluminum, and/or any other suitable materials or combination thereof.

The barrier 104 is a physical structure that separates the spare tire 110 from the area 114. In the illustrated example of FIG. 1, the top of the barrier 104 is coupled to the cross member 108 of the frame 102 and the bottom of the barrier 104 is coupled to the skid plate 106. The barrier 104 is configured to, in the event of an impact to the rear 112 of the vehicle 100, deflect the spare tire 110 downward (e.g., towards the driving surface, etc.) and away from the area 114. In the illustrated example of FIG. 1, the barrier 104 has a curved surface that guides the spare tire 110 downward in the event of a rear impact. That is the barrier 104 includes a surface with curvature that is concave relative to the rear portion 112 of the vehicle 100. The barrier 104 prevents damage to components disposed in the area 114. In some examples, the barrier 104 is a unitary part. In other examples, the barrier 104 can be composed of multiple parts. In some examples, the barrier 104 is a die-cast part. In other examples, the barrier 104 can be manufactured via any suitable process (e.g., machining, stamping, additive manufacturing, etc.) or combination thereof. The barrier 104 is described in greater detail below in conjunction with FIGS. 3A-3D.

The skid plate 106 is coupled to a lower portion of the barrier 104. The skid plate 106 protects the frame 102 and/or the area 114 (e.g., an EV motor disposed therein) from damage that may be caused by objects beneath the vehicle 100. In some examples, the skid plate 106 enables the vehicle 100 to travel on uneven surfaces (e.g., off-road, etc.) while minimizing damage that may occur to the underside of the vehicle 100. The skid plate 106 can be composed of steel, aluminum, and/or any other suitable abrasion-resistant material. In some examples, the skid plate 106 can be further coupled to the frame 102 at another location. In examples disclosed herein, the skid plate 106 is a unitary (e.g., single, etc.) component. In other examples, the skid plate 106 can be composed of any suitable number of parts. In some examples, the skid plate 106 can be absent. In such examples, the bottom of the barrier 104 can be coupled to another portion of the vehicle 100 (e.g., a cross member of the frame 102, etc.).

The cross member 108 is coupled to an upper portion of the barrier 104. The cross member 108 is a structural member of the frame 102 that extends generally parallel to the lateral axis. In the illustrated example, the cross member 108 extends laterally between the side rails of the frame 102 forward of the spare tire 110. The cross member 108 increases the strength of the vehicle frame 102 and enables vehicle components to be coupled in the center of the vehicle 100. In the illustrated example of FIG. 1, the cross member 108 is one of a plurality of cross members of the vehicle frame 102. In other examples, any suitable number of cross members can be included in the vehicle frame 102. The cross member 108 can be composed of steel, aluminum, and/or any other suitable material(s). The cross member 108 can be coupled to the side rails via fasteners (e.g., bolts, rivets, etc.), welds, press fits, and/or any suitable combination of fasteners and/or fastener techniques.

The spare tire 110 is an additional tire that enables the replacement of a tire of the vehicle 100 in the event a tire goes flat during operation of the vehicle 100. In the illustrated example of FIG. 1, the spare tire 110 is mounted at the rear portion 112 underneath the frame 102. During a rear impact, the spare tire 110 can be propelled towards the front of the vehicle 100 (e.g., via direct contact with the impacting object, via inertia, etc.). The behavior of the spare tire 110 during an impact is further discussed below in conjunction with FIGS. 6A-6D.

Figure 2:
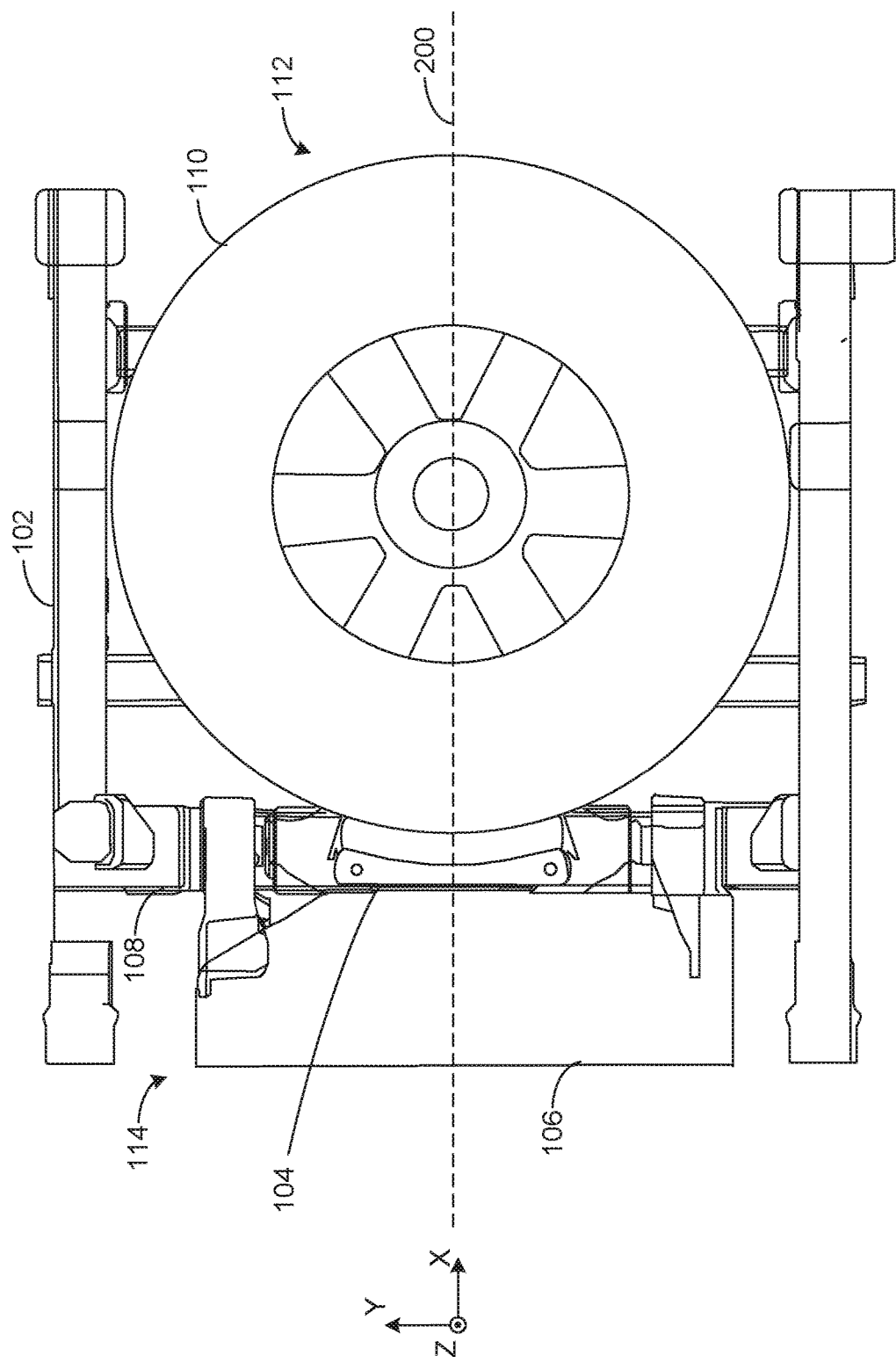
FIG. 2 is a bottom view of the vehicle frame of FIG. 1 illustrating the rear frame barrier.

FIG. 2 is a bottom view of the vehicle frame 102 of FIG. 1 illustrating the rear frame barrier 104. In the illustrated example of FIG. 2, the barrier 104, the skid plate 106, and the spare tire 110 are centered about an example centerline 200 of the vehicle 100 and/or frame 102. In other examples, the barrier 104, the skid plate 106, and/or the spare tire 110 can have any other spatial relationship with the frame 102 and/or vehicle 100. In the illustrated example of FIG. 2, the spare tire 110 abuts the barrier 104. As such, the barrier 104 prevents the spare tire 110 from entering the area 114 during operation of the vehicle 100. In some examples, the vehicle frame 102 can include features not illustrated in FIGS. 1-2. For example, the vehicle frame 102 can include a cover for the spare tire 110 to shield the spare tire 110 from dust, dirt, etc. In some examples, the frame 102 can additionally include rear horns.

FIGS. 3A-3D are various views of the barrier 104 of FIGS. 1 and 2. In the illustrated example of FIGS. 3A-3D, the barrier 104 includes an example first surface 302, an example second surface 303, an example third surface 304, an example fourth surface 305, an example fifth surface 306, an example sixth surface 307, an example first wing 308, and an example second wing 310. In the illustrated examples of FIGS. 3A-3D, the surfaces 303, 304 include example mounting features 312A, 312B, and the surfaces 306, 307 include example mounting features 314A, 314B. In the illustrated examples of FIGS. 3A-3D, the barrier 104 includes an example support 315.

The first surface 302 is opposite the fourth surface 305. The fifth surface 306 is opposite the sixth surface 307. The second surface 303 is opposite the third surface 304. In the illustrated example of FIGS. 3A-3D, the surfaces 303, 304 are substantially perpendicular to the surfaces 306, 307. In other examples, the surfaces 303, 304, and the surfaces 306, 307 can have any other suitable orientations (e.g., substantially parallel, etc.). In the illustrated example of FIGS. 3A-3D, the wings 308, 310 are substantially perpendicular to the surfaces 306, 307. In other examples, the wings 308, 310 can have any other suitable spatial relationship to the surfaces 306, 307.

Figure 3A:
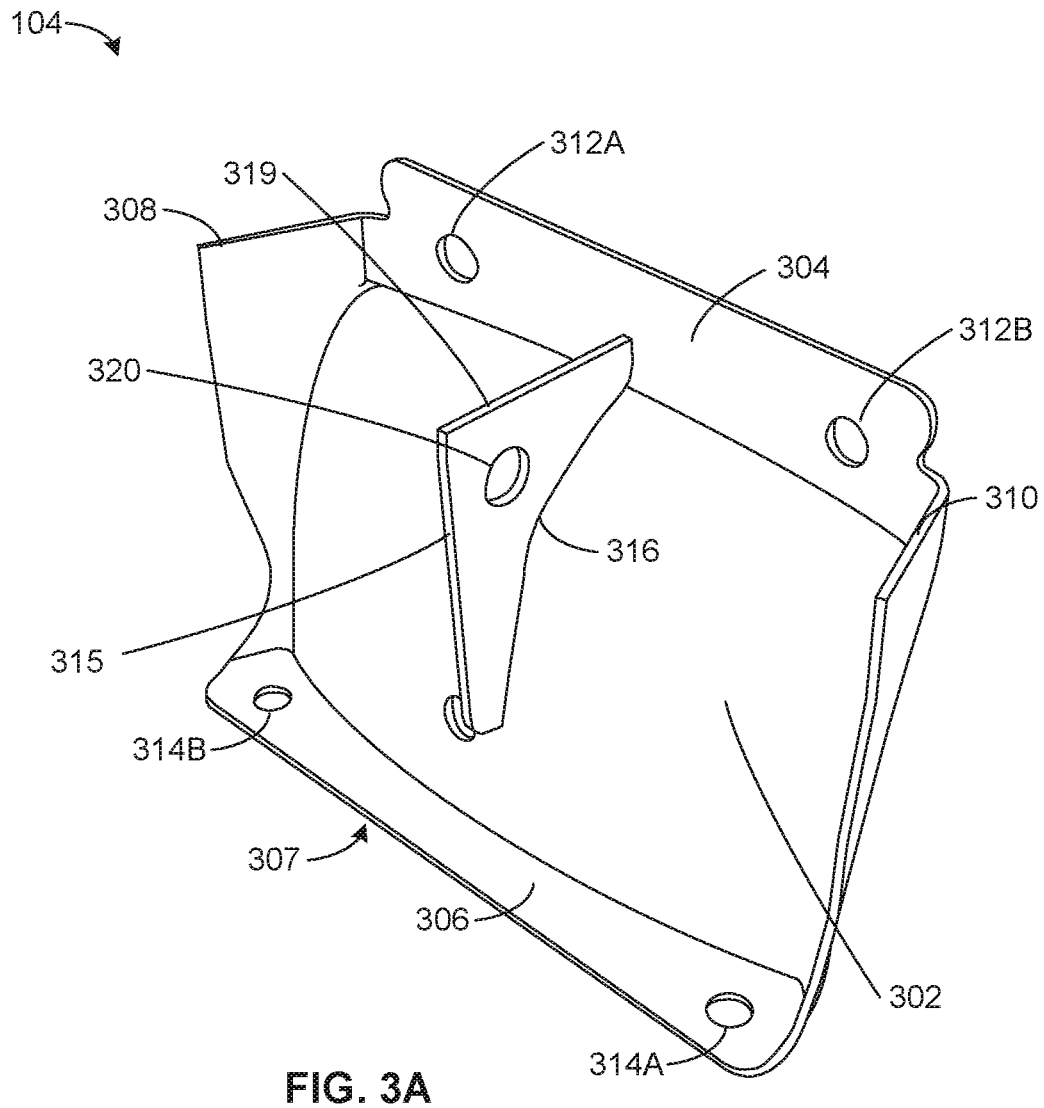
FIGS. 3A-3D are views of the barrier of FIGS. 1 and 2.
Figure 3B:
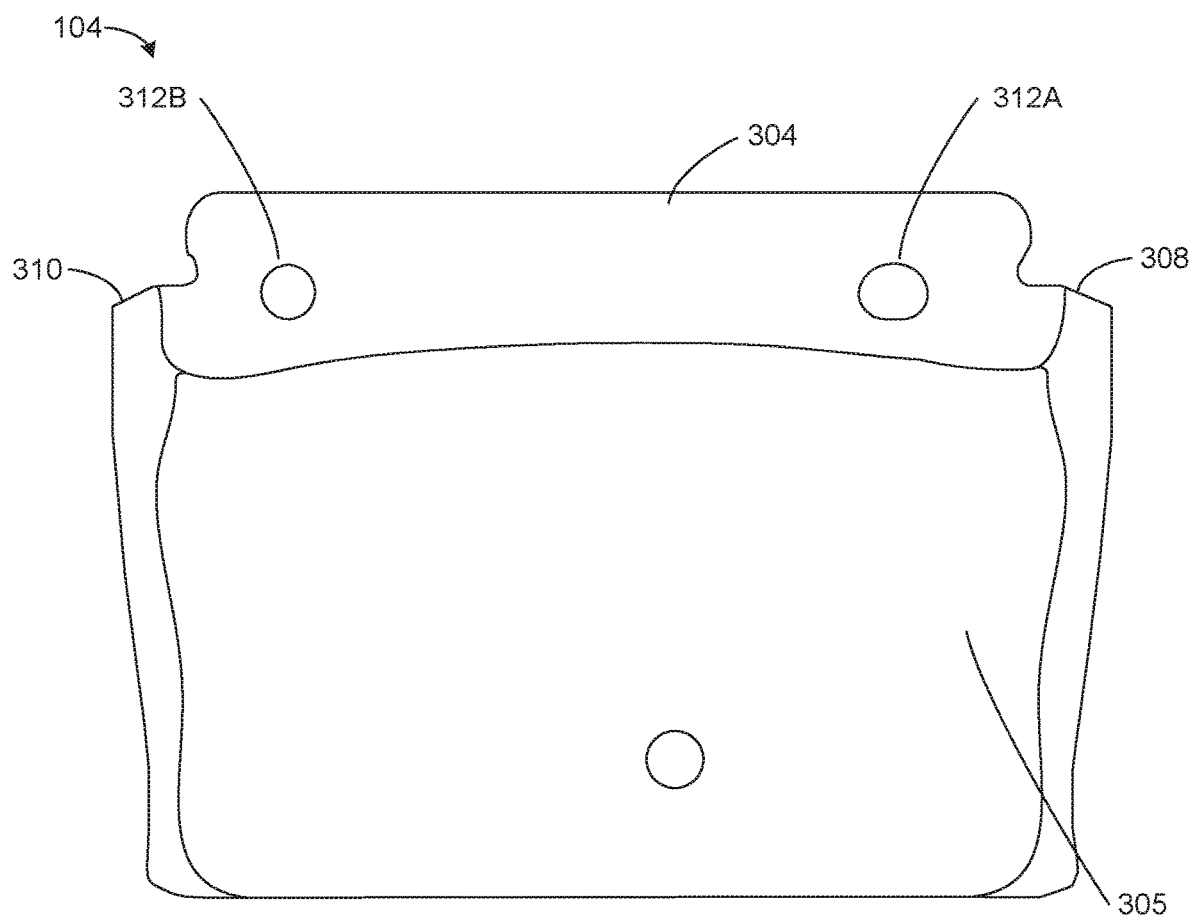
Figure 3C:
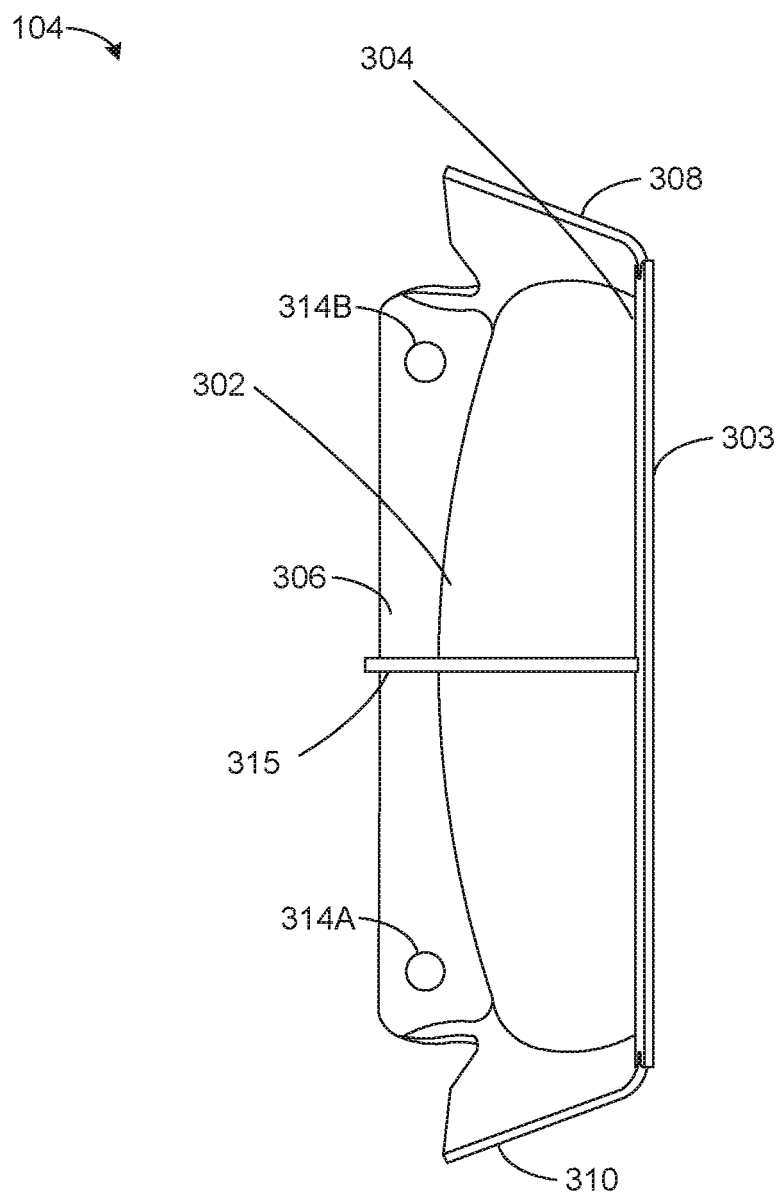
Figure 3D:
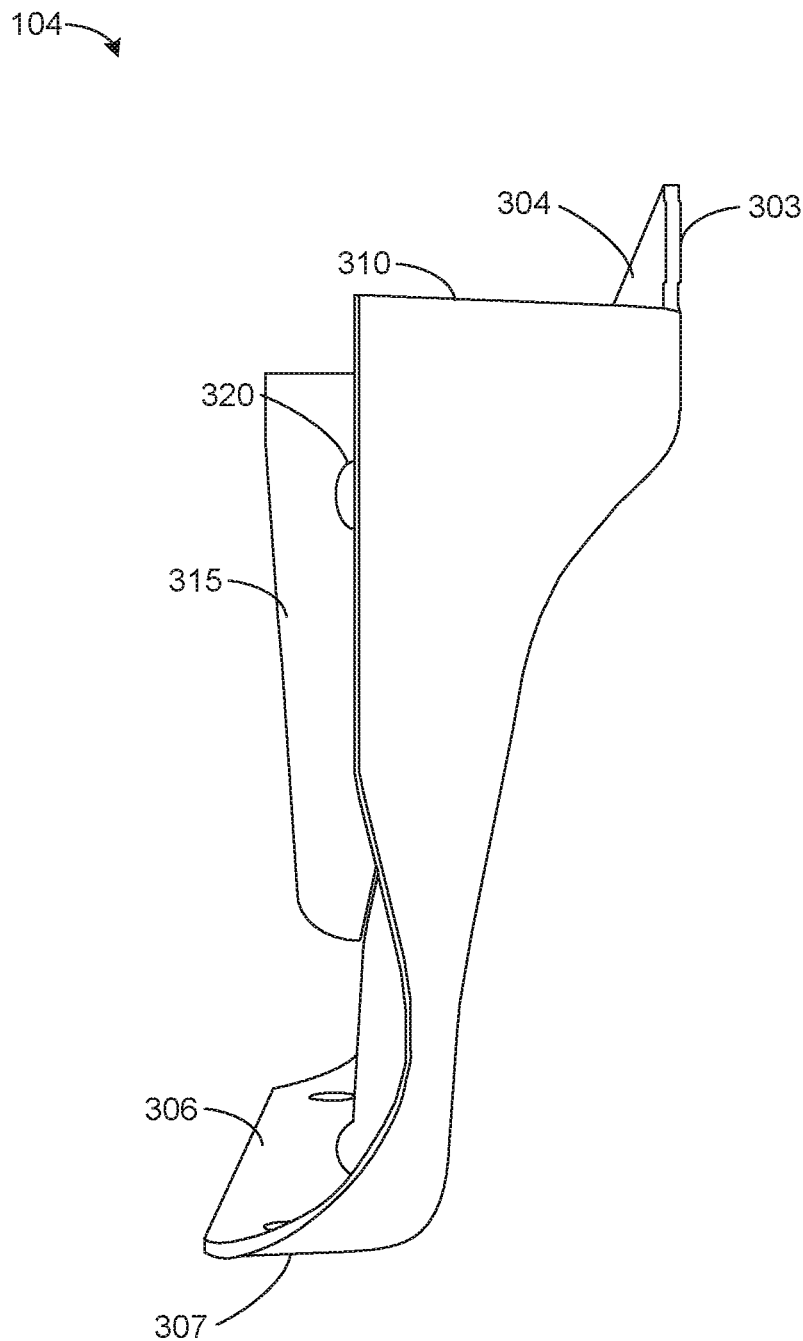

In the illustrated example of FIG. 3B, the surface 305 has a curvature that facilitates the deflection of a spare tire (e.g., the spare tire 110, etc.) downward during an impact. In some examples, the curvature of the surface 305 corresponds with (e.g., is congruent to, etc.) the curvature of a spare tire. In other examples, the surface 305 can have any other suitable curvature (e.g., an arc, an elliptical curve, a parabolic curve, a hyperbolic curve, etc.). In other examples, the surface 305 can have any other suitable shape to facilitate the deflection of the spare time (e.g., linearly sloped, etc.). In some examples, when the barrier 104 is fixed to a vehicle, the surface 305 is concavely oriented relative to the rear of the vehicle.

The mounting features 312A, 312B enable the barrier 104 to be mounted to the cross member 108 via the surface 304. The mounting features 314A, 314B enable the barrier to be mounted to the skid plate 106 via the surface 307. In the illustrated examples of FIGS. 3A-3D, the mounting features 312A, 312B, 314A, 314B are holes to receive fasteners (e.g., bolt holes, etc.). In other examples, some or all of the mounting features 312A, 312B, 314A, 314B can be a different feature (e.g., a weld surface, a threaded hole, etc.). In some examples, some or all of the mounting features 312A, 312B, 314A, 314B can be absent.

The support 315 (e.g., a brace, a reinforcement, etc.) strengthens the barrier 104. In some examples, the support 315 prevents the barrier from inelastically deforming during rear impact (e.g., due to impact from the spare tire 110, etc.). In such examples, the support 315 enables the barrier 104 to be composed of a relatively thinner material. In the illustrated example of FIGS. 3A-3D, the surfaces 302, 303, 304, 305, 306, 307 and the wings 308, 310 are a unitary part and the support 315 is coupled thereto. In such examples, the support 315 can be coupled to the unitary part via any suitable method (e.g., fasteners, welds, press fits, etc.). In other examples, the surfaces 302, 303, 304, 305, 306, 307, the wings 308, 310, and the support 315 are a unitary part.

In the illustrated example of FIGS. 3A-3D, the support 315 is substantially perpendicular to the first surface 302 of the barrier 104. In some examples, the support 315 is substantially parallel to the wings 308, 310. In other examples, the support 315 can be angularly displaced from the wings 308, 310. In the illustrated examples of FIGS. 3A-3D, the support 315 includes an example curved portion 316 to engage with and/or be fixed to the surface 302 along a correspondingly curved portion of the surface 302. In the illustrated example of FIGS. 3A-3D, the barrier 104 is symmetric about the support 315. In other examples, the barrier 104 and the support 315 can have any other suitable relationship. The support 315 can be composed of steel, aluminum, and/or any other suitable material (e.g., another metal, a polymer, a plastic, etc.). In some examples, the support 315 can include features (e.g., an example weld surface 319, etc.) that enable the support 315 to be coupled the vehicle frame 102 (e.g., via the cross member 108, etc.). In the illustrated example, the support 315 includes an example hole 320. In some examples, the hole 320 reduces the weight of the barrier 104. In other examples, the hole 320 can be absent. In some examples, the support 315 can be absent.

Figure 4:
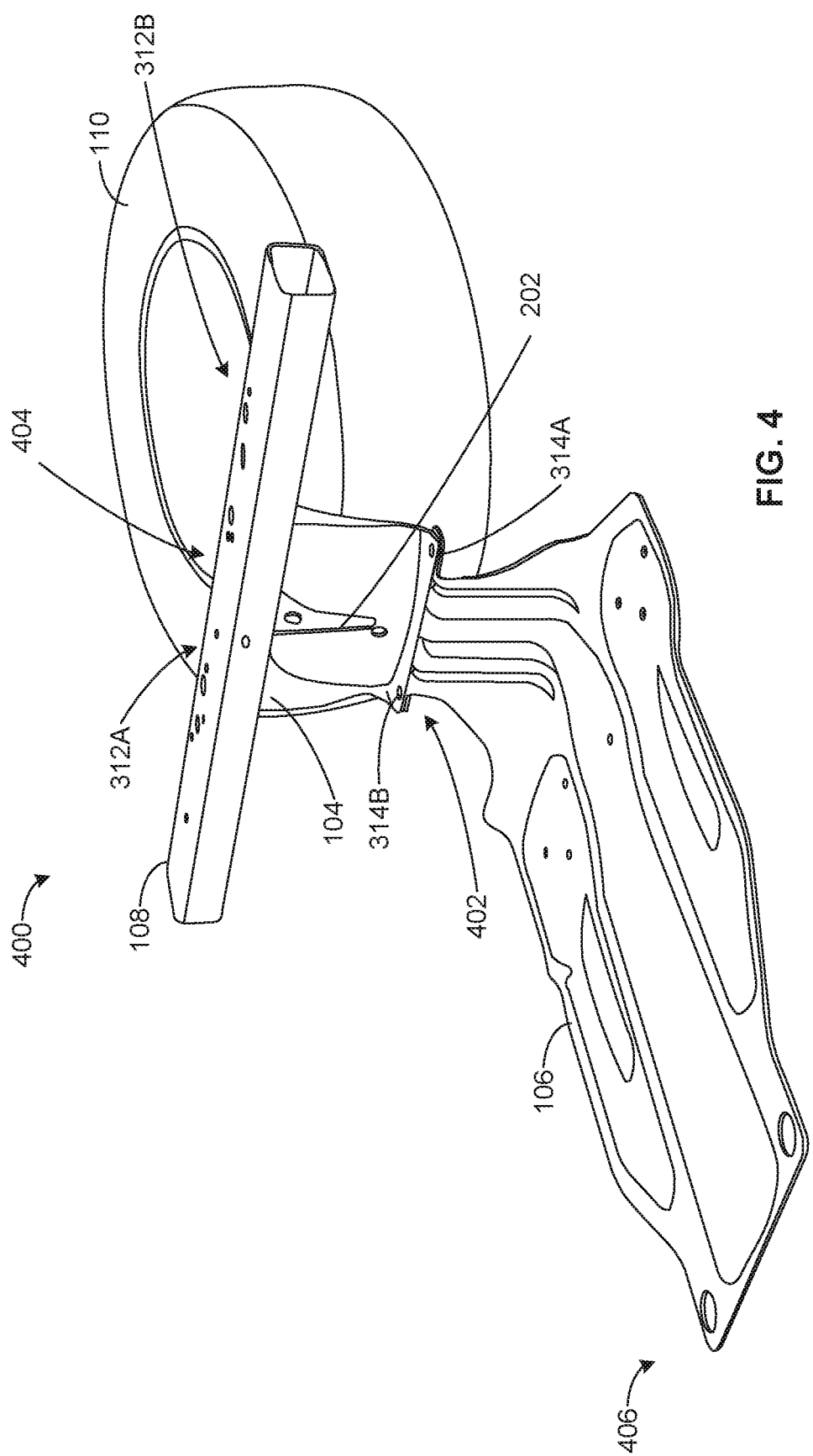
FIG. 4 is a perspective view of an assembly including the barrier of FIGS. 1-3D.

FIG. 4 is a perspective view of an assembly 400 including the barrier 104 of FIGS. 1-3D. In the illustrated example of FIG. 4, the assembly 400 includes the skid plate 106, the cross member 108, and the spare tire 110 of FIGS. 1-2. In the illustrated example of FIG. 4, the barrier 104 is coupled to the skid plate 106 via an example first coupling 402 and the barrier 104 is coupled to the cross member 108 via an example second coupling 404.

The first coupling 402 connects the barrier 104 and the skid plate 106. In the illustrated example of FIG. 4, the coupling 402 is implemented via a weld. In other examples, the coupling 402 can be implemented via any other suitable type of fastening device and/or method. Additionally or alternatively, the coupling 402 can include one or more fasteners (e.g., bolts, screws, etc.) joining the barrier 104 to the skid plate 106 via the mounting features 314A, 314B and corresponding holes on the skid plate 106. In some examples, the skid plate 106 can be coupled to the cross member 108 and/or any other suitable portion of the frame. An example front 406 of the skid plate 106 can additionally be coupled to another suitable component of a vehicle (e.g., another portion of the frame, a subframe, etc.).

The second coupling 404 connects the barrier 104 and the cross member 108. In the illustrated example of FIG. 4, the coupling 404 is implemented via a weld. In other examples, the coupling 404 can be implemented via any other suitable type of fastening device and/or method. Additionally or alternatively, the coupling 404 can include one or more fasteners (e.g., bolts, screws, etc.) joining the barrier 104 to the skid plate 106 via the mounting features 312A, 312B. In some examples, the skid plate 106 can be absent. In such examples, the second coupling 404 can couple the barrier 104 to another suitable vehicle component (e.g., another portion of the frame 102, etc.).

Figure 5:
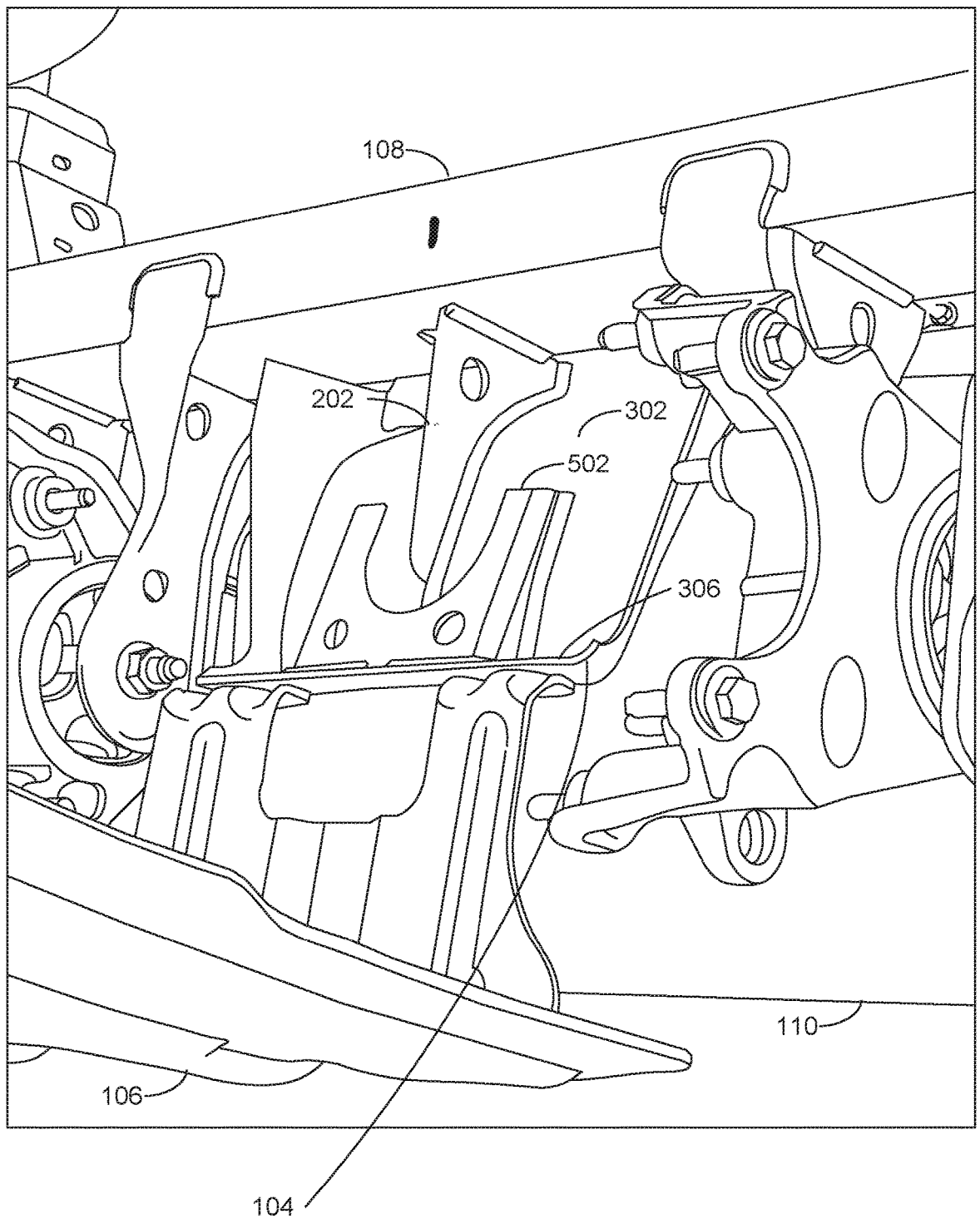
FIG. 5 is a first perspective view of the barrier of FIGS. 1-4 coupled to the vehicle and abutting a spare tire.

FIG. 5 is a first perspective view of the barrier 104 of FIGS. 1-4 coupled to the cross member 108 and abutting the spare tire 110. In the illustrated example of FIG. 5, the barrier 104 includes an example brace 502. The example brace 502 is a structural feature that inhibits the deformation of the barrier 104. The brace 502 is coupled to the surface 306 and the surface 302 of the barrier 104. The brace 502 is a U-shaped structural member. In other examples, the brace 502 can have any other suitable shape (e.g., polygonal, etc.). In the illustrated example of FIG. 5, the brace 502 is a unitary part. In other examples, the brace 502 can be composed of any suitable material (e.g., aluminum, steel, polymer, plastic, etc.). While the brace 502 is depicted with the example support 315b in the illustrated example of FIG. 5, in other examples, the brace 502 and/or the support 315 can be absent.

Figure 6A:
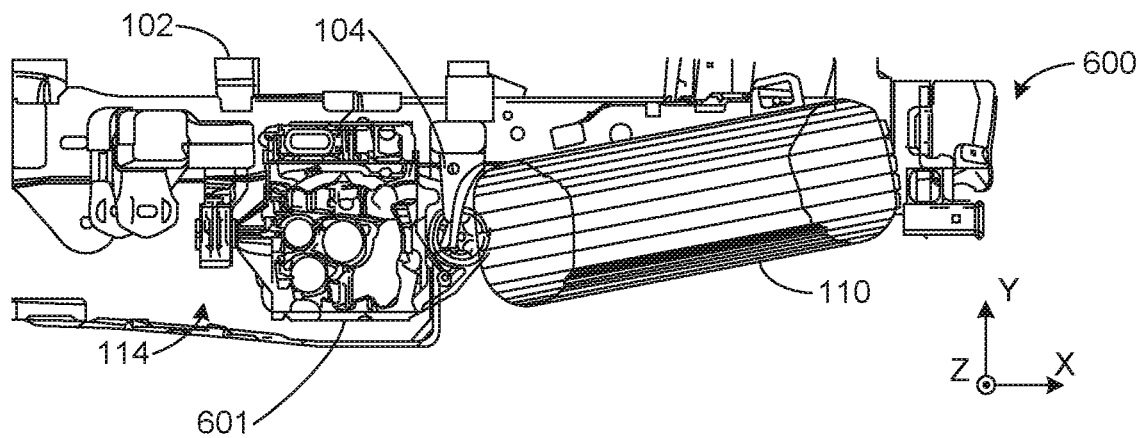
FIGS. 6A-6C are side-views of the barrier of FIGS. 1-5 experiencing a rear impact.
Figure 6B:
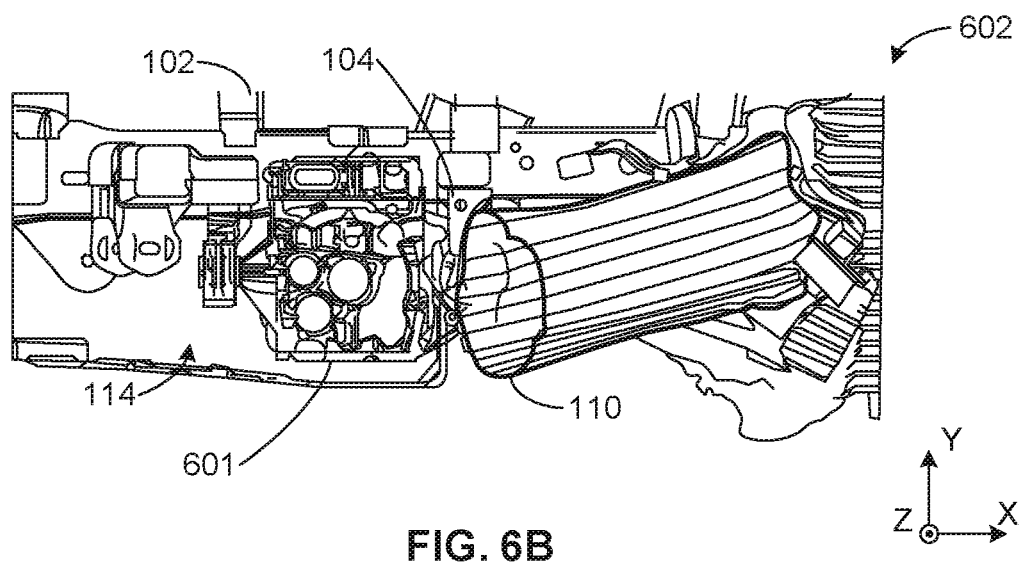
Figure 6C:
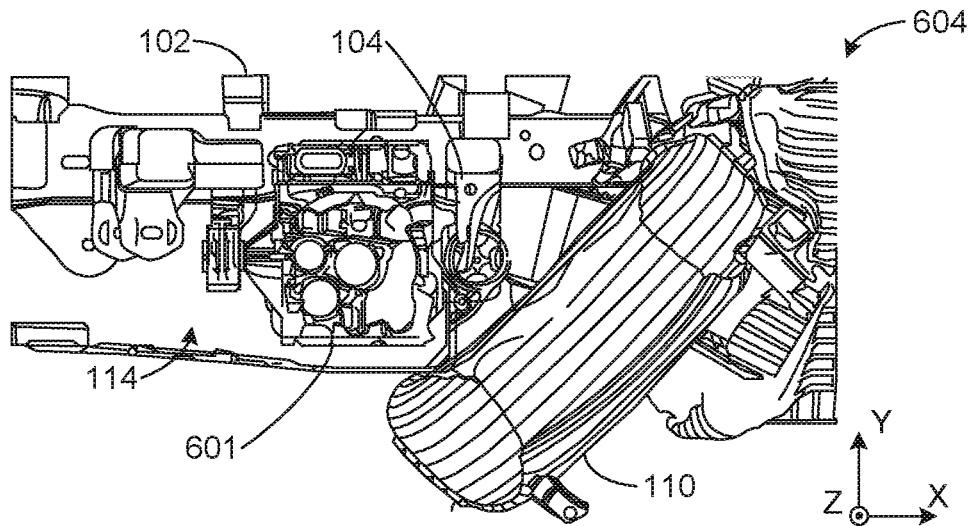

FIGS. 6A-6C are side-views of the barrier 104 of FIGS. 1-5 experiencing a rear impact. In the illustrated examples of FIGS. 6A-6C, an example electric motor 601 is disposed in the area 114. In other examples, any other components can be disposed in the example area 114 (e.g., an internal combustion engine, other components of the powertrain, batteries, a gas tank, etc.).

FIG. 6A is a side-view of the frame 102 in an example pre-impact state 600. In the illustrated example of FIG. 6A, the barrier 104 and spare tire 110 are in a similar arrangement as the illustrated examples of FIGS. 1 and 2. FIG. 6B is a side-view of the frame 102 in an example impact state 602. In the illustrated example of FIG. 6B, the rear 112 of the vehicle 100 has been impacted by an object (e.g., another vehicle, etc.), which causes the spare tire 110 to be propelled towards the front of the vehicle 100. FIG. 6C is a side view of the frame 102 in an example post-impact state 604. In the illustrated examples of FIGS. 6B and 6C, the barrier 104 deflects the spare tire 110 downwards away from the vehicle 100. In such examples, the barrier 104 protects the other components of the vehicle (e.g., the electric motor 601, etc.) from damage. As such, the barrier 104 reduces the repair costs associated with repairing the vehicle after the impact (e.g., by reducing damage to comparatively expensive vehicle parts such as the electric motor 601, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Barriers for rear frame mounted spare tires are disclosed herein. Further examples and combinations thereof include the following:

Example 1 includes a vehicle comprising a frame including a cross member, a spare tire, a skid plate, and a barrier extending between the skid plate and the cross member, the barrier abutting the spare tire, the barrier including a first surface having a first curvature, the first curvature concave relative to a rear of the vehicle.

Example 2 includes the vehicle of example 1, further including a motor, the barrier disposed between the motor and the spare tire.

Example 3 includes the vehicle of example 2, wherein the first surface is to deflect the spare tire downward during a rear impact.

Example 4 includes the vehicle of example 2, wherein the first curvature is congruent to a second curvature of the spare tire.

Example 5 includes the vehicle of example 1, wherein the barrier includes a brace coupled to a second surface of the barrier opposite the first surface.

Example 6 includes the vehicle of example 5, wherein the brace is U-shaped.

Example 7 includes the vehicle of example 5, wherein the brace is further coupled to a third surface of the barrier, the third surface opposite a fourth surface of the barrier, the fourth surface coupled to the skid plate.

Example 8 includes the vehicle of example 1, wherein the barrier further includes a first wing, a second wing, and a support between the first wing and the second wing.

Example 9 includes the vehicle of example 8, wherein the support is coupled to the cross member.

Example 10 includes the vehicle of example 8, wherein the barrier is a unitary part.

Example 11 includes an apparatus to be coupled between a cross member of a frame and a skid plate, the apparatus comprising a first surface including first mounting features to enable the apparatus to be coupled to the cross member, a second surface including second mounting features to enable the apparatus to be coupled to the skid plate, and a third surface extending between the first surface and the second surface, the third surface having a curvature oriented to deflect a spare tire downward.

Example 12 includes the apparatus of example 11, further including a brace coupled to a fourth surface opposite the third surface.

Example 13 includes the apparatus of example 12, wherein the brace is U-shaped.

Example 14 includes the apparatus of example 11, further including a first wing, a second wing, and a support between the first wing and the second wing, the support oriented perpendicularly to the second surface.

Example 15 includes the apparatus of example 14, wherein the support is configured to be coupled to the cross member.

Example 16 includes the apparatus of example 14, wherein the apparatus is symmetric about the support.

Example 17 includes the apparatus of example 11, wherein the first mounting features are holes.

Example 18 includes the apparatus of example 11, wherein the second mounting features are holes.

Example 19 includes the apparatus of example 11, wherein the first surface, the second surface and the third surface are part of a unitary part.

Example 20 includes the apparatus of example 11, wherein the first surface is perpendicular to the second surface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle comprising:
    a frame including a cross member;
    a spare tire;
    a skid plate; and
    a barrier extending between the skid plate and the cross member, the barrier abutting the spare tire, the barrier including a first surface having a first curvature, the first curvature concave relative to a rear of the vehicle.

2. The vehicle of claim 1, further including a motor, the barrier disposed between the motor and the spare tire.

3. The vehicle of claim 2, wherein the first surface is to deflect the spare tire downward during a rear impact.

4. The vehicle of claim 2, wherein the first curvature is congruent to a second curvature of the spare tire.

5. The vehicle of claim 1, wherein the barrier includes a brace coupled to a second surface of the barrier opposite the first surface.

6. The vehicle of claim 5, wherein the brace is U-shaped.

7. The vehicle of claim 5, wherein the brace is further coupled to a third surface of the barrier, the third surface opposite a fourth surface of the barrier, the fourth surface coupled to the skid plate.

8. The vehicle of claim 1, wherein the barrier further includes:
    a first wing;
    a second wing; and
    a support between the first wing and the second wing.

9. The vehicle of claim 8, wherein the support is coupled to the cross member.

10. The vehicle of claim 8, wherein the barrier is a unitary part.

11. An apparatus to be coupled between a cross member of a frame and a skid plate, the apparatus comprising:
    a first surface including first mounting features to enable the apparatus to be coupled to the cross member;
    a second surface including second mounting features to enable the apparatus to be coupled to the skid plate; and
    a third surface extending between the first surface and the second surface, the third surface having a curvature oriented to deflect a spare tire downward.

12. The apparatus of claim 11, further including a brace coupled to a fourth surface opposite the third surface.

13. The apparatus of claim 12, wherein the brace is U-shaped.

14. The apparatus of claim 11, further including:
    a first wing;
    a second wing; and
    a support between the first wing and the second wing, the support oriented perpendicularly to the second surface.

15. The apparatus of claim 14, wherein the support is configured to be coupled to the cross member.

16. The apparatus of claim 14, wherein the apparatus is symmetric about the support.

17. The apparatus of claim 11, wherein the first mounting features are holes.

18. The apparatus of claim 11, wherein the second mounting features are holes.

19. The apparatus of claim 11, wherein the first surface, the second surface and the third surface are part of a unitary part.

20. The apparatus of claim 11, wherein the first surface is perpendicular to the second surface.

* * * * *